United States Patent [19]
Takei

[11] Patent Number: 5,696,411
[45] Date of Patent: Dec. 9, 1997

[54] LINEAR DIRECT CURRENT MOTOR

[75] Inventor: Seiji Takei, Kanagawa, Japan

[73] Assignee: Nippon Thompson Co., Ltd., Tokyo, Japan

[21] Appl. No.: 530,925

[22] Filed: Sep. 20, 1995

[30] Foreign Application Priority Data

Sep. 21, 1994 [JP] Japan .................. 6-252916

[51] Int. Cl.⁶ .................................................. H02K 41/00
[52] U.S. Cl. .................................................. 310/12
[58] Field of Search .................. 310/12, 13, 14; 318/135

[56] References Cited

U.S. PATENT DOCUMENTS 4,912,746  3/1990  Oishi ..................................... 310/12

Primary Examiner—Steven L. Stephan
Assistant Examiner—Judson H. Jones
Attorney, Agent, or Firm—Sughrue,Mion,Zinn,Macpeak & Seas, PLLC

[57] ABSTRACT

A linear direct current motor in which one of the primary and secondary sides is provided with two rows of field magnets that are shifted in phase by 1/8 with respect to each other so that different thrust is obtained from each row of field magnets, but the combined thrust is less variable as compared to a single row of field magnets, and there is less thrust ripple.

3 Claims, 16 Drawing Sheets

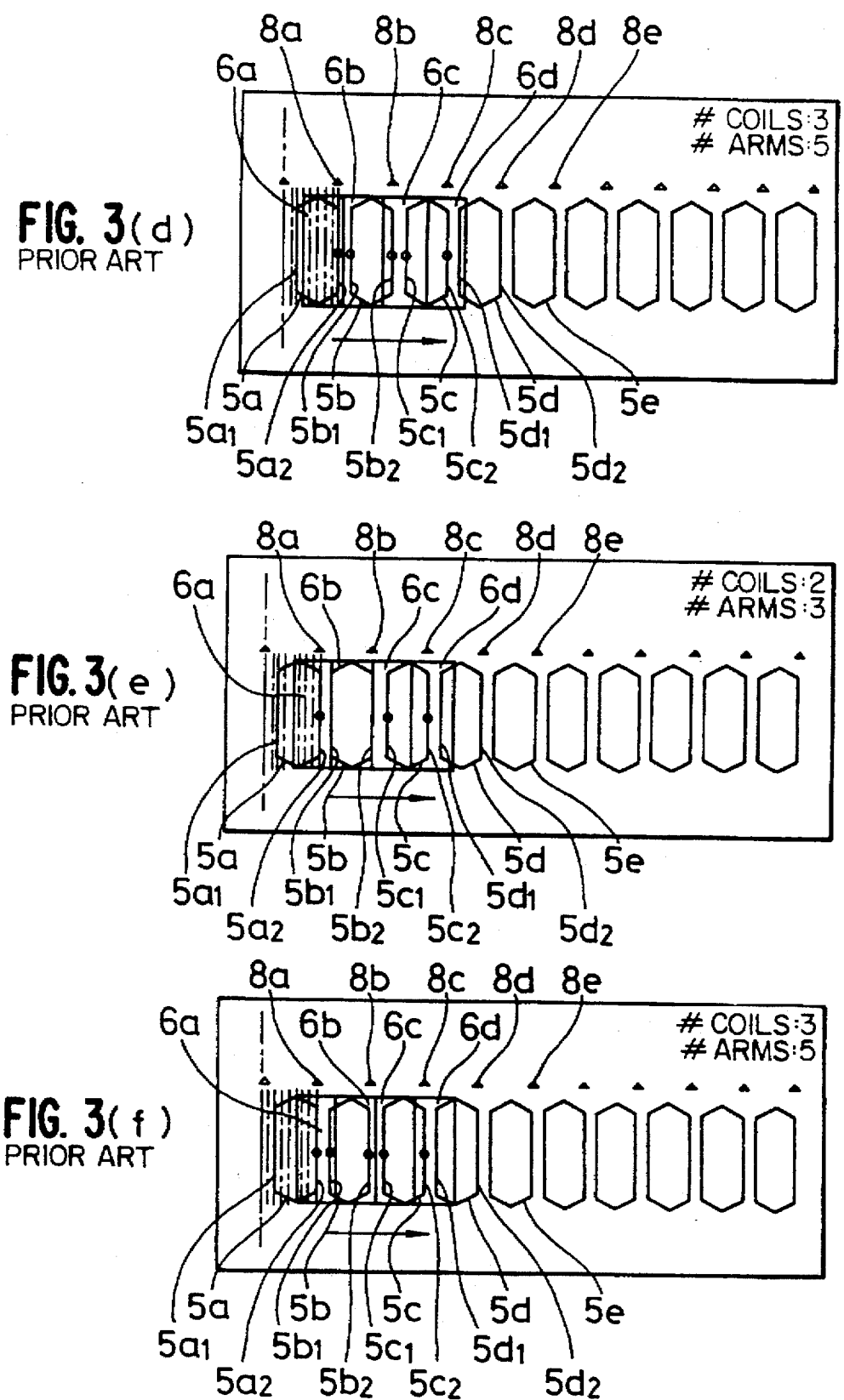

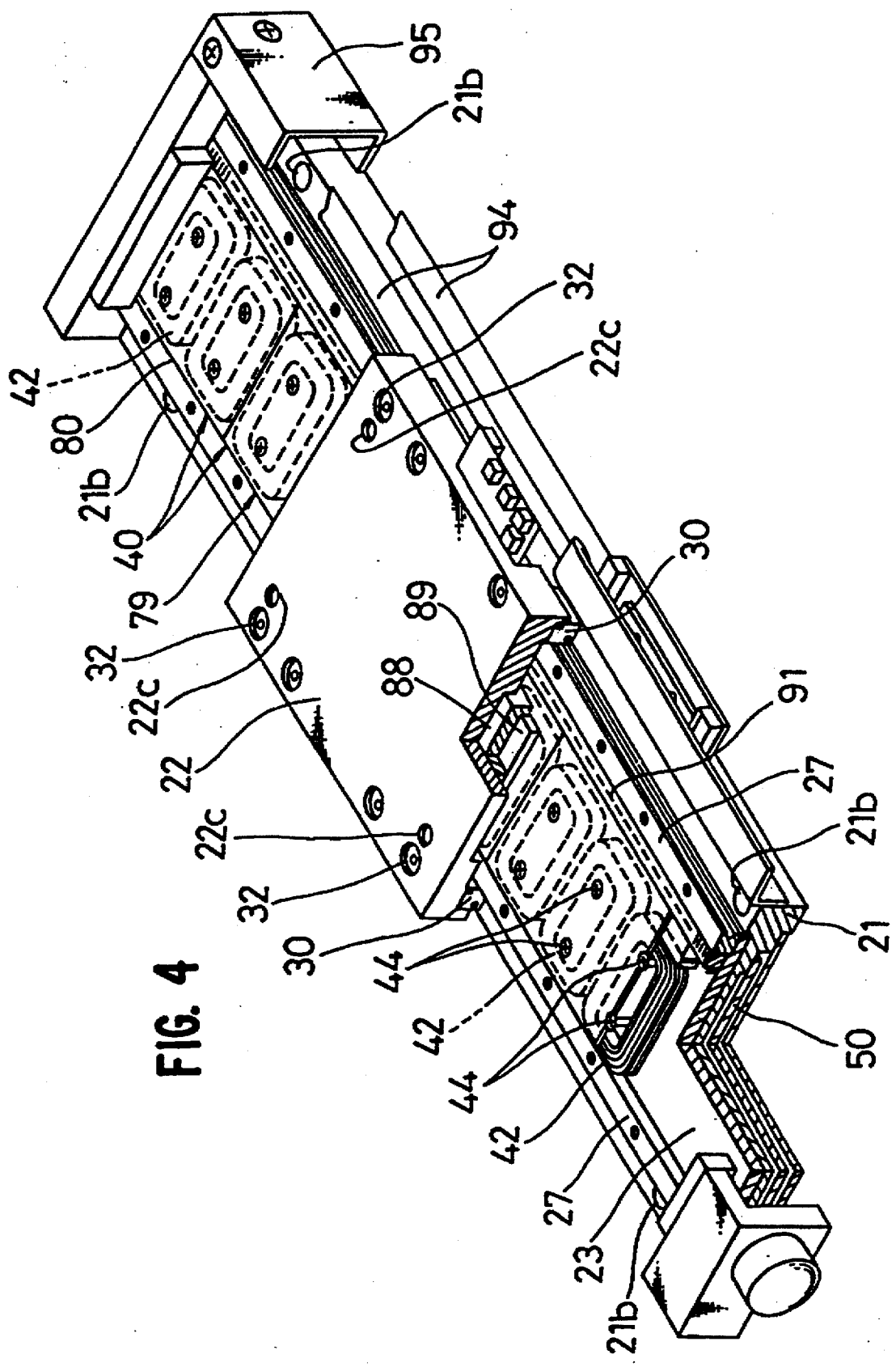

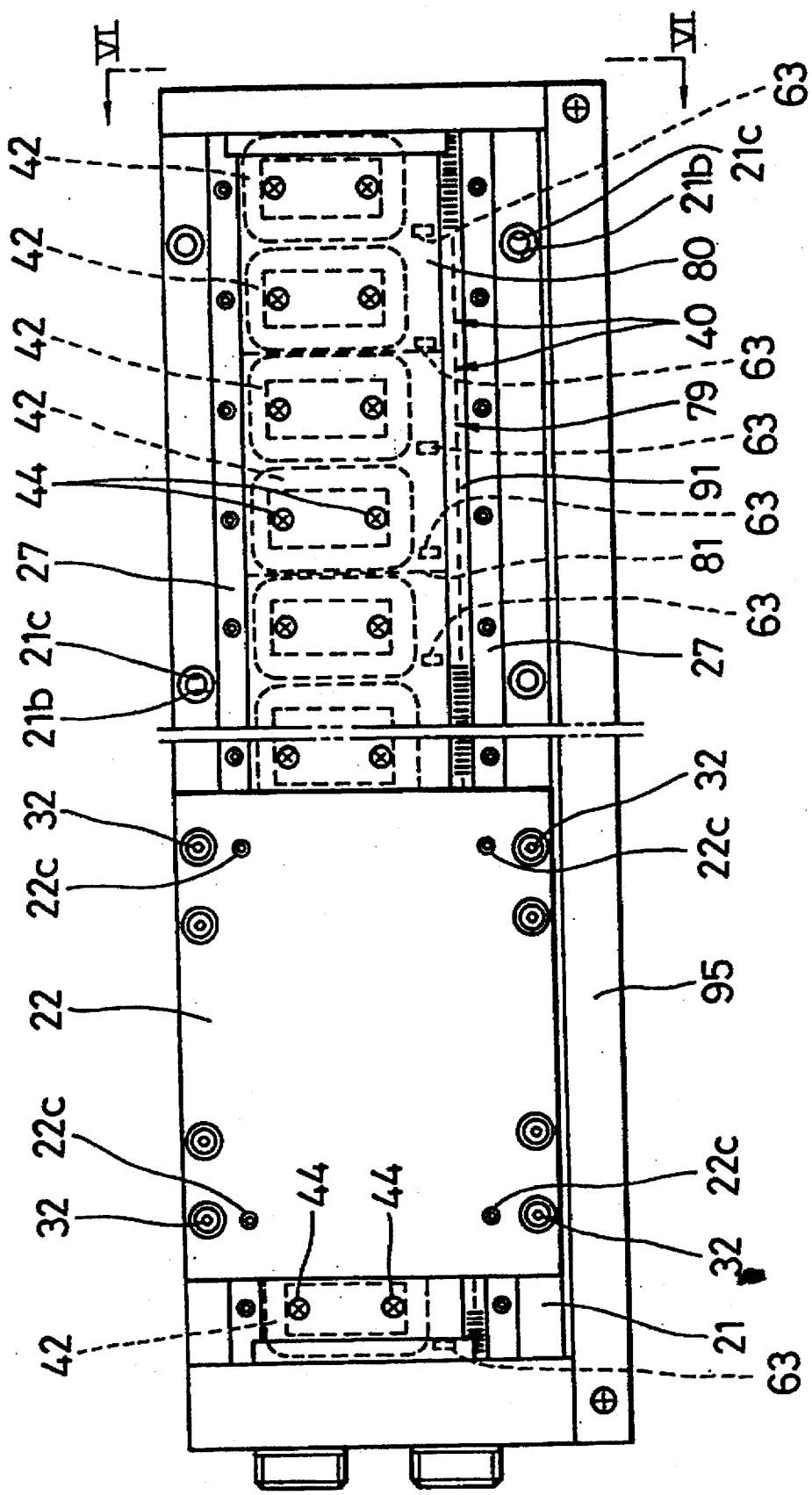

FIG. 12(a) PRIOR ART
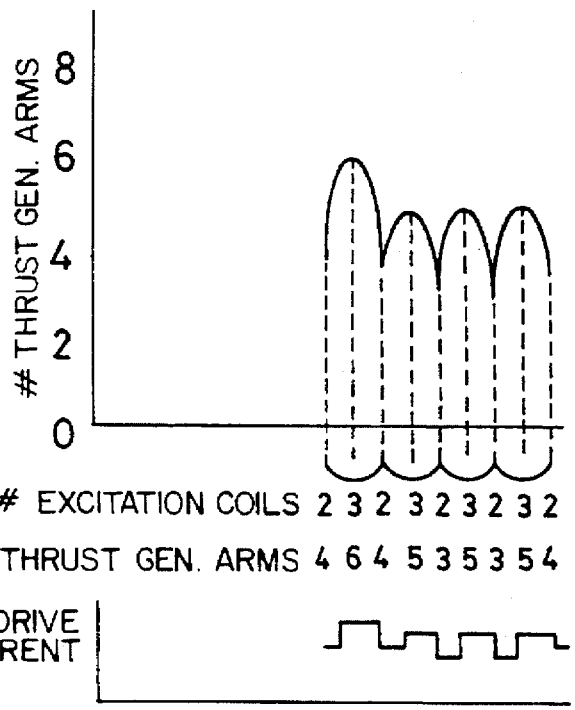
FIG. 12(b) PRESENT INVENTION
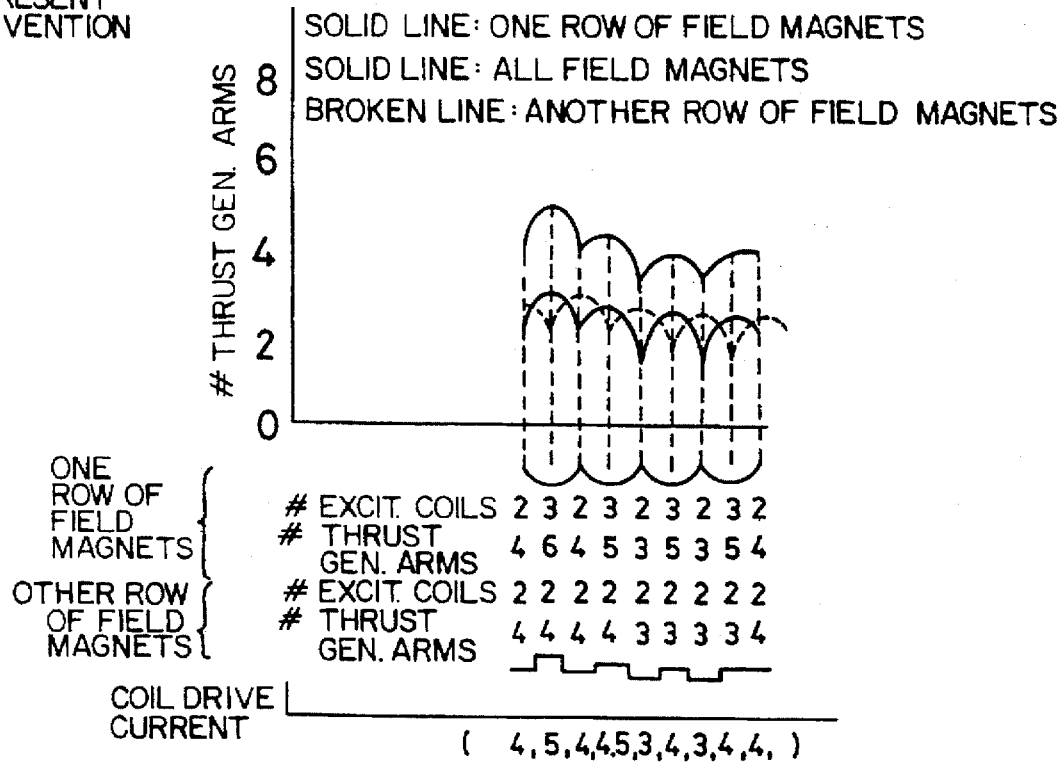

LINEAR DIRECT CURRENT MOTOR

BACKGROUND OF THE INVENTION

1. Field of the Invention

The present invention relates to a linear direct current motor commonly used for moving an object to be moved with high accuracy in, for example, a motion mechanism such as a machine tool or industrial robot, and more particularly, to a brushless type of linear direct current motor.

2. Description of the Prior Art

FIG. 1 shows a drive unit containing a linear direct current motor of the prior art. Furthermore, this drive unit has a guide unit for guiding an object added to a linear direct current motor.

As shown in the drawing, this guide unit has a long base member 1 and moving body 2 that moves along said base member 1. More specifically, a plurality of rollers (not shown) are provided on moving body 2, and these rollers roll over a track (not shown) formed along the lengthwise direction in base member 1.

On the other hand, the linear direct current motor that composes a drive unit together with the above-mentioned guide unit is composed in the manner described below.

Said linear direct current motor is composed of a primary side, equipped with a large number of armature coils 5 arranged in a row in the lengthwise direction of base member 1 on said base member 1, and a secondary side, having a field magnet 6 (see FIG. 2) attached to the bottom surface of moving body 2 so as to oppose each of said armature coils 5. As shown in the drawing, said field magnet 6 is magnetized so that a plurality, in this case 4, of N and S magnetic poles are alternately arranged in a row along direction P in which moving body 2 is to move, namely the lengthwise direction of base member 1. Furthermore, as shown in FIG. 2, if the width of one magnetic pole of field magnet 6 is taken to be Pm in this example, the open angle width of each armature coil 5 is set to the same Pm, and the interval of the armature coils is set to Pm/3.

In the linear direct current motor of the above-mentioned constitution, by supplying a prescribed excitation current to armature coils 5, thrust is generated based on Fleming's left hand rule between the primary and secondary sides. For example, if base member 1, to which the primary side is coupled, is taken to be the stationary side, moving body 2, integrated into a single unit with the secondary side, is moved by this thrust.

However, in the linear direct current motor as described above, it is important to systematically supply an excitation current to each armature coil to maintain as constant a thrust as possible regardless of changes in the position of the primary side with respect to the secondary side. Continuing, the following provides an explanation of the constitution pertaining to this supply of power.

As shown in FIGS. 3(a) through 5(a), magnetic pole discrimination elements in the form of Hall effect elements 8a through 8e are respectively arranged in the vicinity of each armature coil 5a through 5e (these five armature coils are mutually distinguished by adding small letters of the alphabet from a through e to reference numeral 5 indicating armature coils in the explanation thus far for the sake of convenience in the explanation). In this example, each of Hall effect elements 8a through 8e is arranged corresponding to conductors $5a_2$ through $5e_2$ on one side among the conductors (arms) that contribute to thrust possessed on two sides by each armature coil 5a through 5e. These Hall effect elements 8a through 8e emit a signal (in the form a potential difference) corresponding to the lines of magnetic force emitted by each magnetic pole possessed by field magnet 6 when said field magnet 6 approaches. Electrical power is then supplied to the armature coil corresponding to the Hall effect element that emitted said signal based on that signal. Alternatively, this supply of electrical power is interrupted to the armature coil corresponding to a Hall effect element for which said signal has yet to be obtained or is no longer being obtained, thus enabling control to be performed.

Control of the supply of electrical power is performed in the manner described below based on said constitution.

FIGS. 3(a) through 3(i) show the field magnet 6 at each of its positions.

To begin with, in the case field magnet 6 is located at the position shown in FIG. 3(a), since each of magnetic poles 6b and 6c of said field magnet 6 acts on two Hall effect elements 8a through 8b, the two armature coils 5a and 5b that respectively correspond to these Hall effect elements are supplied with electrical power. Furthermore, although operation after this point is similar, the Hall effect elements that act on the respective boundaries of each magnetic pole (6a and 6d) do not operate. In this state, all conductors, which are possessed on two sides each by each of said armature coils 5a and 5b, contribute to thrust, and these conductors consist of conductors $5a_1$, $5a_2$, $5b_1$ and $5b_2$. These are indicated with a circle in FIG. 3. Thrust is generated since these four conductors act on magnetic poles 6a, 6b and 6c of field magnet 6. Furthermore, since conductors $5c_1$ and $5c_2$ of the other armature coil 5c act on the boundary between corresponding magnetic poles of field magnet 6, thrust is not generated even though power is supplied to armature coil 5c.

Next, as shown in FIGS. 3(b) through 3(i), in the case the open angle width of the armature coils is taken to be Pm, the interval between the armature coils is taken to be Pm/3, and this is divided into 8 divisions, when field magnet 6 is at the position shown in FIG. 3(b), namely when moved by ⅛, since each of magnetic poles 6a through 6d of said field magnet 6 acts on three Hall effect elements 8a through 8c, three armature coils 5a through 5c, which respectively correspond to these Hall effect elements, are supplied with electrical power. In this state, conductors possessed on two sides each by each of said armature coils 5a, 5b and 5c all contribute to thrust, and consist of the six conductors $5a_1$, $5a_2$, $5b_1$, $5b_2$, $5c_1$ and $5c_2$. These are indicated with a circle in FIG. 3. Thrust is generated since these six conductors act on magnetic poles 6a, 6b, 6c and 6d of field magnet 6.

Thus, when field magnet 6 is at each of the positions of FIG. 3(c) through FIG. 3(i), electrical power is continued to be supplied to the prescribed armature coils in the same manner as described above. FIG. 16 (a) illustrates the relationship with coil drive current based on the number of coils and the number of arms obtained in this manner.

Although excitation current is supplied to each armature coil in the manner described above in the above-mentioned example of a linear direct current motor of the prior art, the prior art has the problems described below.

Namely, when the field magnet is located at the position shown in FIG. 3(a), thrust is actually generated by four of the conductors that contribute to thrust possessed by each armature coil as previously described. However, the number of conductors (arms) that generate thrust changes when field magnet 6 is moved to the other positions shown in FIGS. 3(b) through 3(i) mentioned above, namely being 6, 4, 5, 3, 5, 3, 5 and 4 conductors, respectively. Thus, thrust ripple becomes large due to the wide range of this variation. This is clear from FIG. 12 (a).

SUMMARY OF THE INVENTION

In consideration of the above-mentioned problems of the prior art, the object of the present invention is to provide a linear direct current motor able to reduce thrust ripple and perform smooth operation.

The linear direct current motor according to the present invention is equipped with: a field magnet in which P number of poles (P being an integer of at least 2) are arranged and magnetized so that they are sequentially different; a group of armature coils wound so that the open angle width of the conductors contributing to thrust is roughly 2n−1 times (where n is an integer of at least 1) the magnetic pole width of said field magnet, which relatively drive said field magnet by being arranged so as to oppose said field magnet and supplying excitation current; and, magnetic pole discrimination elements, provided corresponding to each said armature coil, which perform discrimination of the magnetic poles of said field magnet; wherein, said field magnet is composed of a plurality of rows of field magnets in which the phase of the magnetic pole arrangement differs.

BRIEF DESCRIPTION OF THE DRAWINGS

FIGS. 3(a) through 3(i) are explanatory drawings of the operation of the linear direct current motor contained in the drive unit shown in FIG. 1.

FIG. 4 is a perspective view, including a partial cross-section, of a drive unit containing a linear direct current motor as an embodiment of the present invention.

FIG. 5 is an overhead view of the drive unit shown in FIG. 4.

FIGS. 12(a) and 12(b) are explanatory drawings that compare in thrust between the drive unit of the prior art and the drive unit of the embodiment of the present invention.

DESCRIPTION OF THE PREFERRED EMBODIMENTS

The following provides an explanation of a drive unit containing a linear direct current motor as claimed in the present invention with reference to the drawings. Furthermore, this linear direct current motor is of the moving magnet type.

Said drive unit is composed by mutually combining a guide unit, which supports an object to be moved and guides said object with high accuracy, and a linear direct current motor, which functions as a driving device that drives said guide unit.

To begin with, the following provides an explanation of the above-mentioned guide unit.

Figure 1:
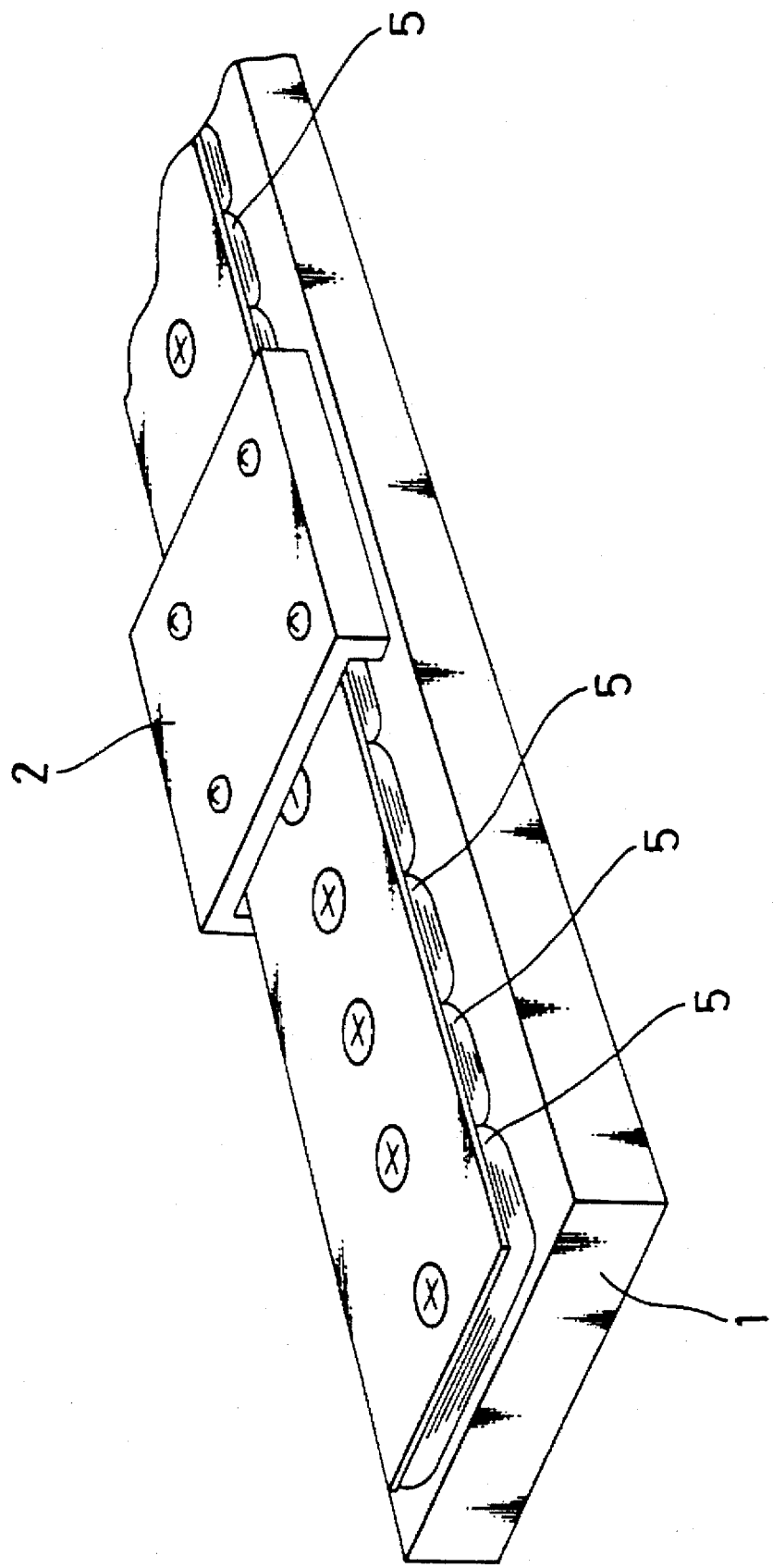
FIG. 1 is a perspective view of a portion of a drive unit containing a linear direct current motor of the prior art.
Figure 2:
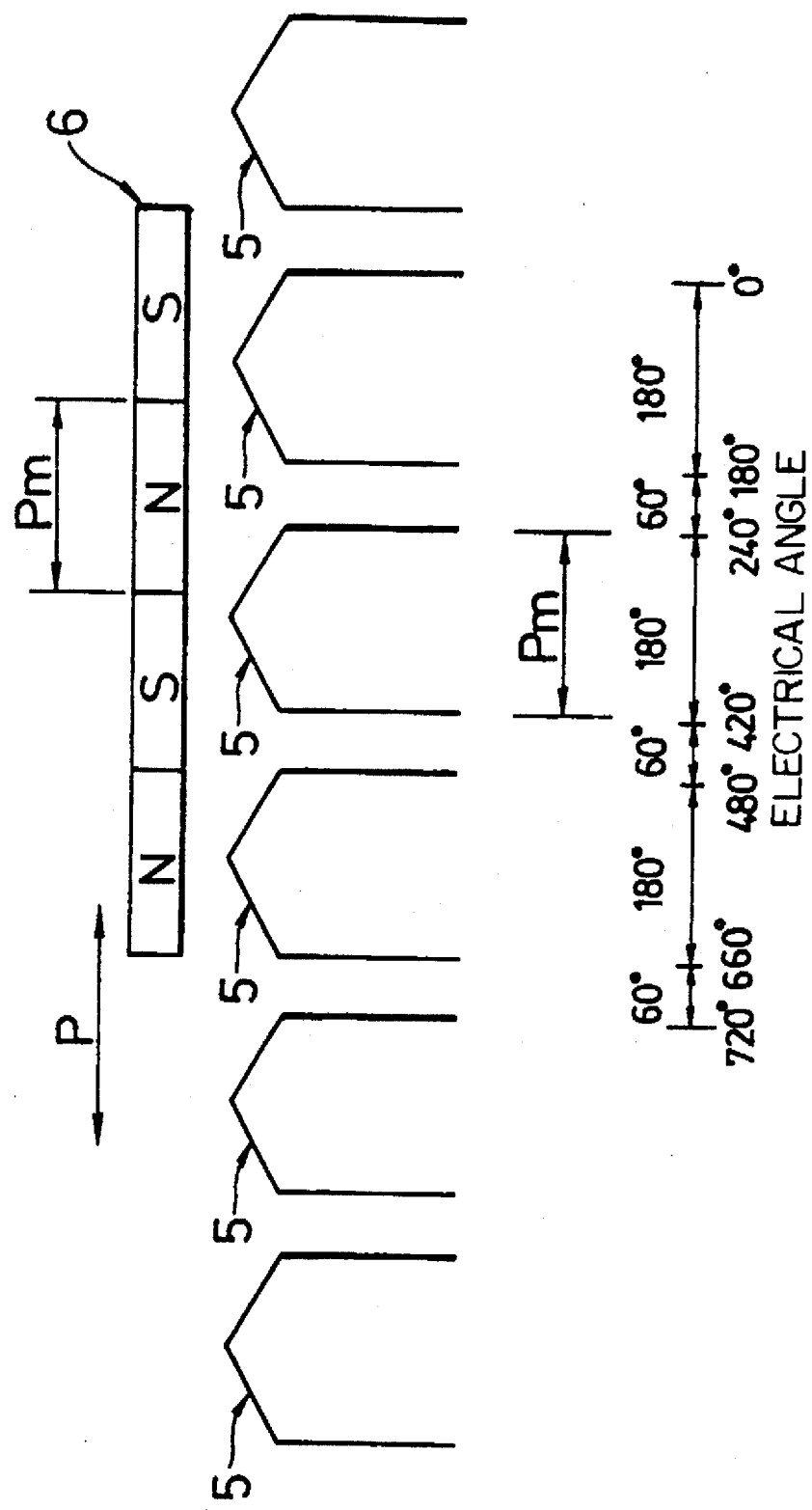
FIG. 2 is a conceptual drawing of the constitution of the linear direct current motor contained in the drive unit shown in FIG. 1.
Figure 3A:
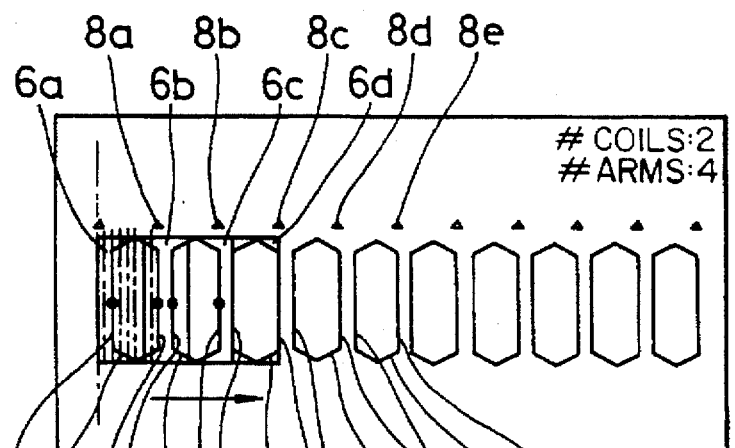
Figure 3B:
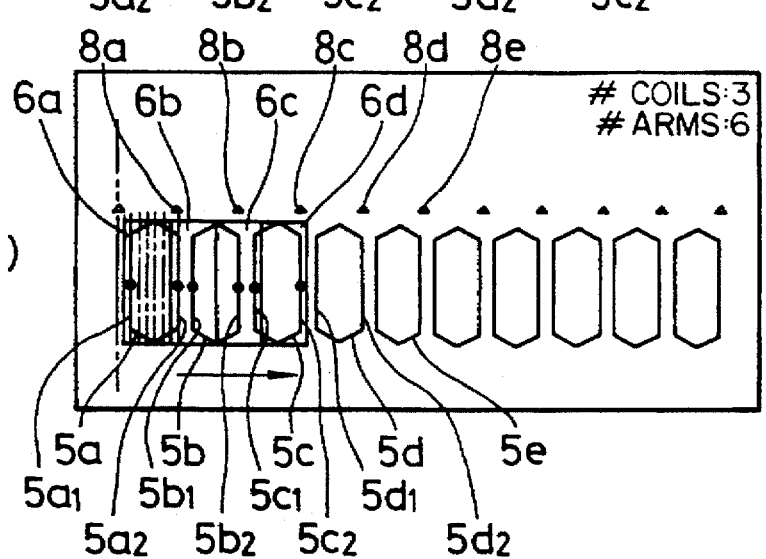
Figure 3C:
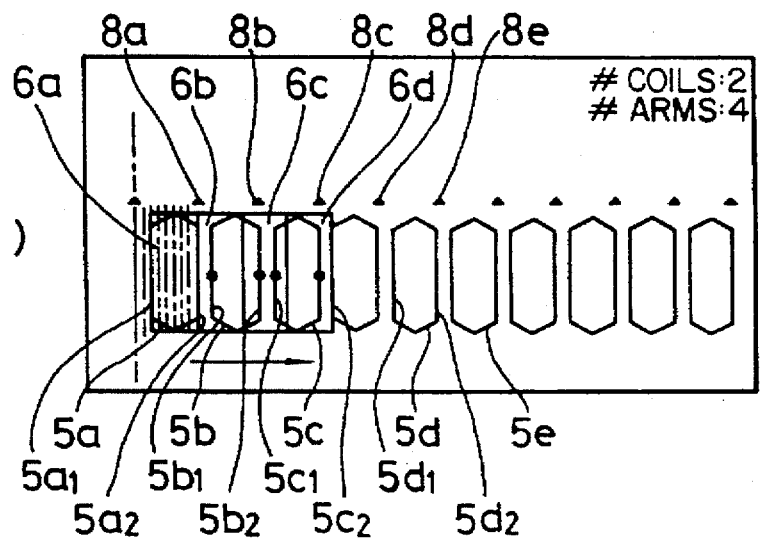
Figure 3G:
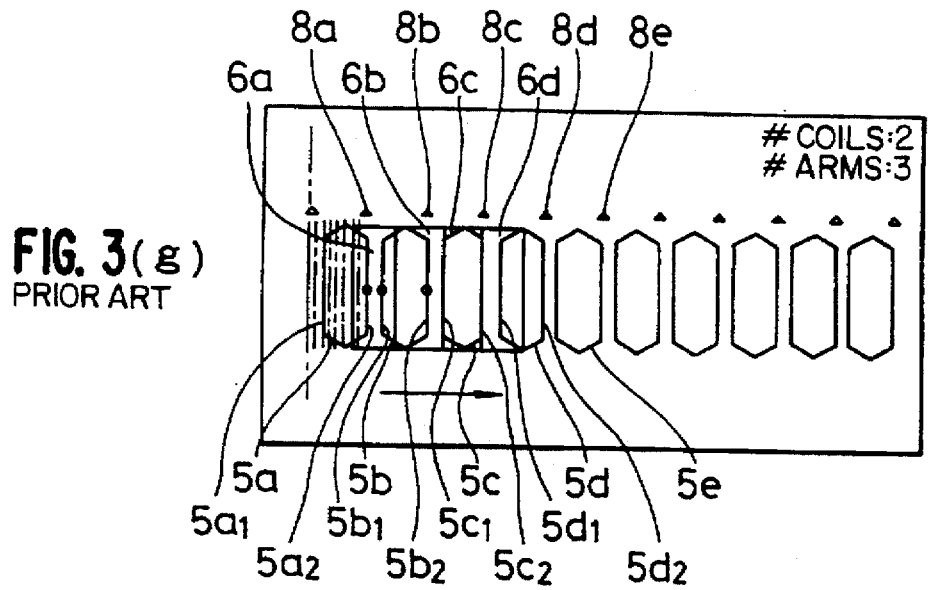
Figure 3H:
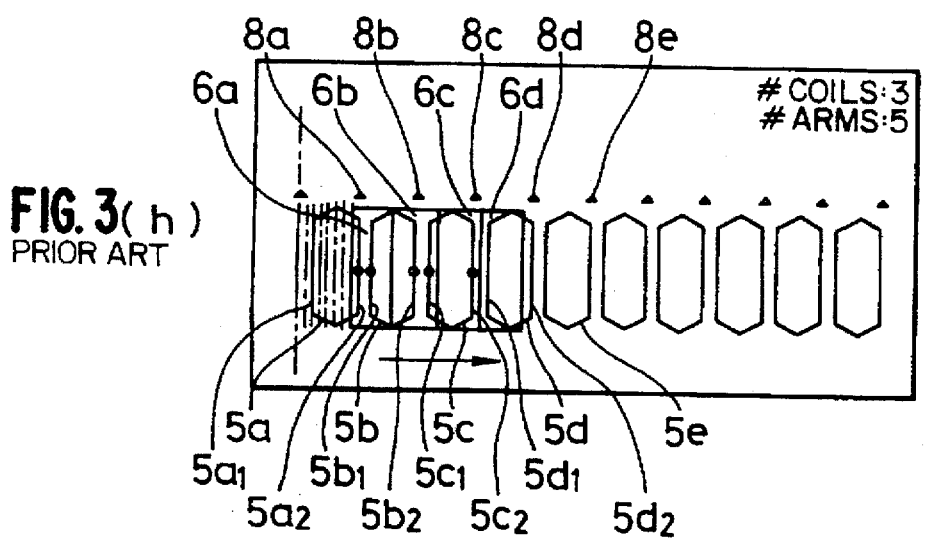
Figure 3I:
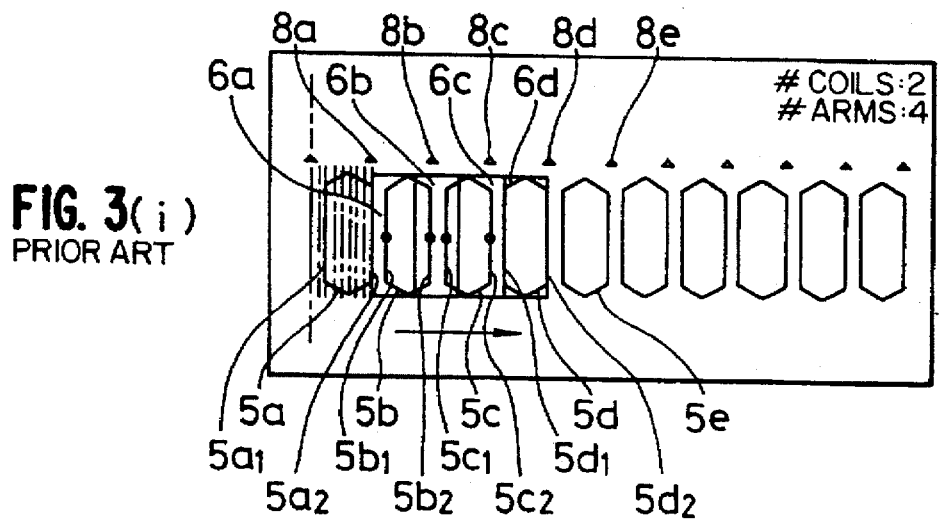
Figure 6:
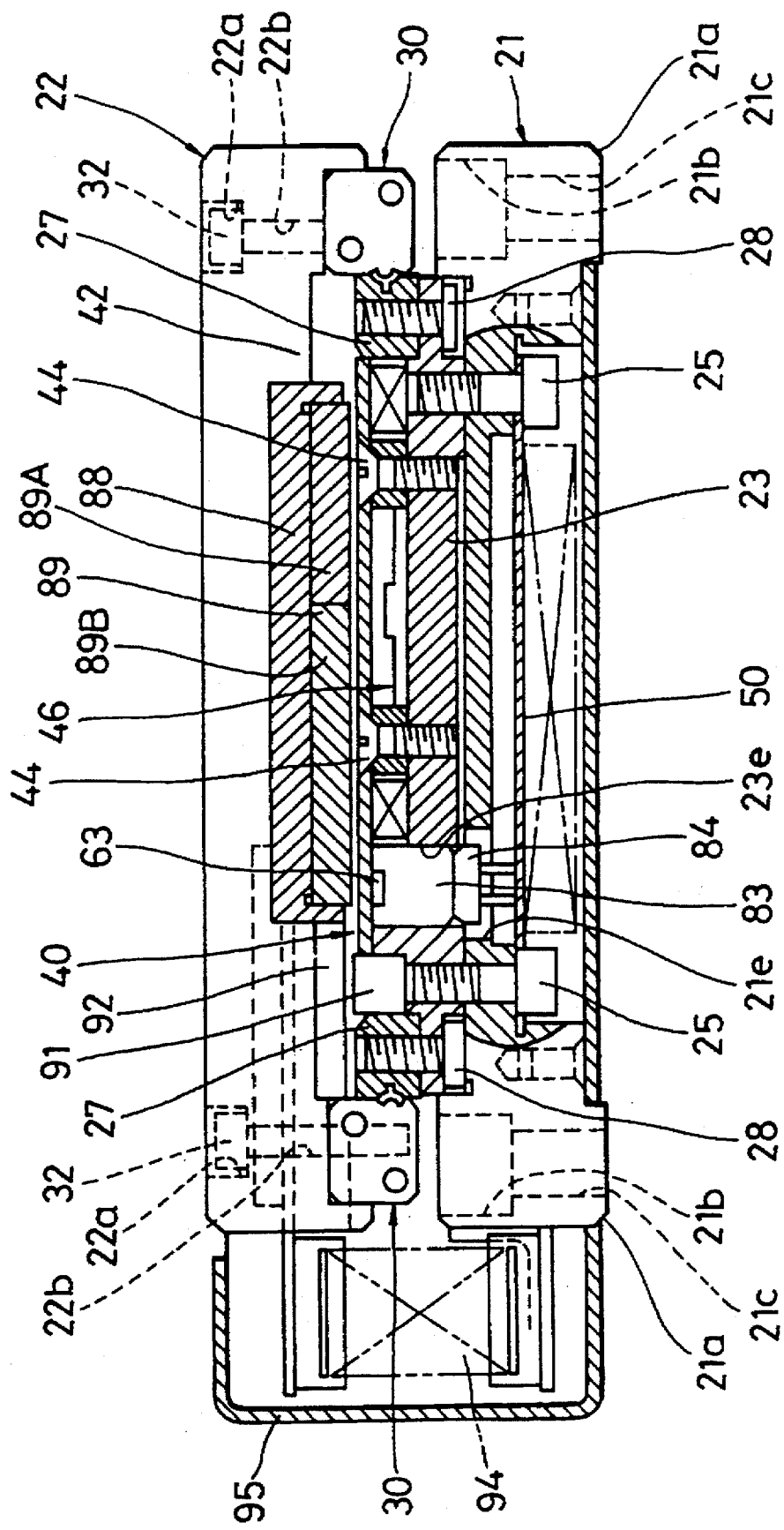
FIG. 6 is a view, including a partial cross-section, taken along arrows VI—VI relating to FIG. 5.

As shown in FIGS. 4 through 6, this guide unit has bed 21 formed roughly into the overall shape of, for example, a rectangular plate, and table 22 to move along the lengthwise direction of said bed 21. As shown in FIGS. 4 through 6 coil yoke 23, formed roughly into the shape of a rectangular plate and having nearly the same length as bed 21, is arranged on the upper surface of said bed 21, and is fastened to said bed 21 by a plurality of bolts 25 (with hexagon sockets, see FIG. 6).

Two track rails in the form of track rails 27 are arranged on both sides of the upper surface of said coil yoke 23 along the lengthwise direction of said coil yoke 23, and are fastened to said coil yoke 23 by a plurality of flat head screws 28 (see FIG. 6).

Figure 7:
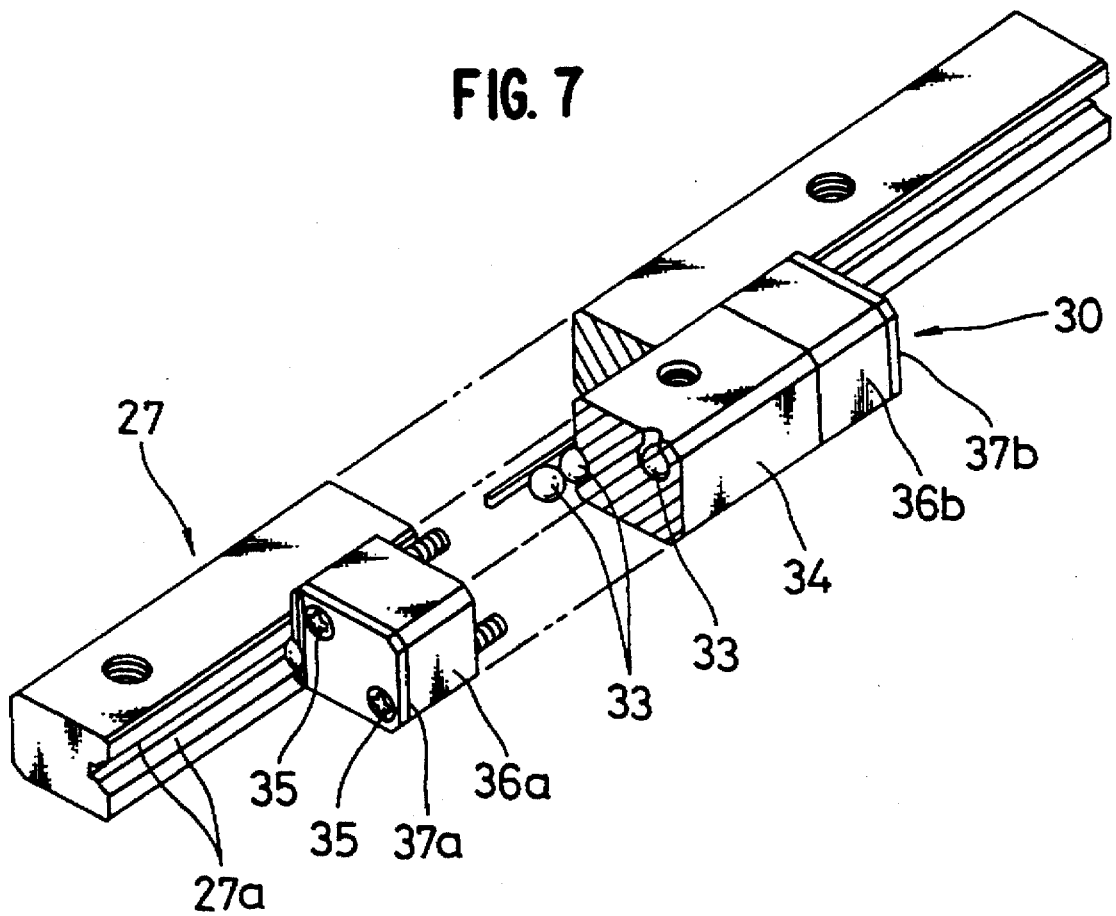
FIG. 7 is a perspective view, including a partial cross-section, of a trace rail and slide member equipped on the drive unit shown in FIGS. 4 through 6.

As shown in FIG. 7, a track in the form of a single track groove 27a, having a roughly semi-circular shaped cross-section, is formed in the outside of the above-mentioned track rail 27. As is clear from FIGS. 4 through 6, a slider in the form of slide member 30, able to freely perform relative motion with respect to said track rail 27, is arranged on the outside of said track rail 27, and is fastened to the lower surface of table 22 by, for example, two bolts 32 (with hexagon sockets). Furthermore, as shown in FIG. 6, countersunk portions 22a and insertion holes 22b are formed in table 22 into which the head portions and threaded portions, respectively, of bolts 32 are inserted. Bolts 32 are embedded in these countersunk portions 22a and insertion holes 22b, and do not protrude from the upper surface of table 22.

A rolling element circulating path (not shown) is formed in the above-mentioned slide member 30, and rolling elements in the form of a large number of balls 33 are arranged and contained within said rolling element circulating path. These balls 33 bear the load between track rail 27 and slide member 30 by circulating while rolling over track groove 27a of track rail 27 accompanying movement of slide member 30 with respect to track rail 27.

As shown in FIG. 7, the above-mentioned slide member 30 has casing 34, a pair of end caps 36a and 36b coupled to both ends of said casing 34 by round head screws 35, and two seals 37a and 37b fastened to the outer surfaces of both of said end caps 36a and 36b. The above-mentioned rolling element circulating path is composed of a load bearing track groove and return path formed in casing 34 mutually in parallel and passing linearly through said casing 34 in its lengthwise direction, and a pair of roughly arc-shaped direction changing paths formed in both end caps 36a and 36b that connect both ends of said load bearing track groove and return path. Furthermore, said load bearing track groove opposes track groove 27a of track rail 27.

The guide unit of the constitution described above is fastened to a flat mounting surface equipped on, for example, a machine tool (not shown) by a plurality of bolts (with hexagon sockets: not shown). Consequently, as shown in FIG. 6, bed 21 has flat mounting bottom surface 21a for anchoring said bed 21 to said mounting surface. As shown in FIGS. 4 through 6, countersunk portions 21b and insertion holes 21c are formed in both sides of bed 21 into which the head portions and threaded portions of the above-mentioned bolts for fastening said bed are respectively inserted. Said bolts are embedded in these countersunk portions 21b and insertion holes 21c, and do not protrude from the upper surface of bed 21. In addition, as shown in FIGS. 4 and 5, for example, four threaded holes 22c are formed in the four corners of the upper surface of table 22 able to move with respect to this bed 21, and a table (not shown) equipped on an apparatus on which said drive unit is equipped is fastened to said table 22 by bolts (not shown) screwed into these threaded holes 22c.

Continuing, the following provides a detailed description of the primary and secondary sides of the linear direct current motor that is mutually combined with the guide unit having the constitution described above.

Figure 8:
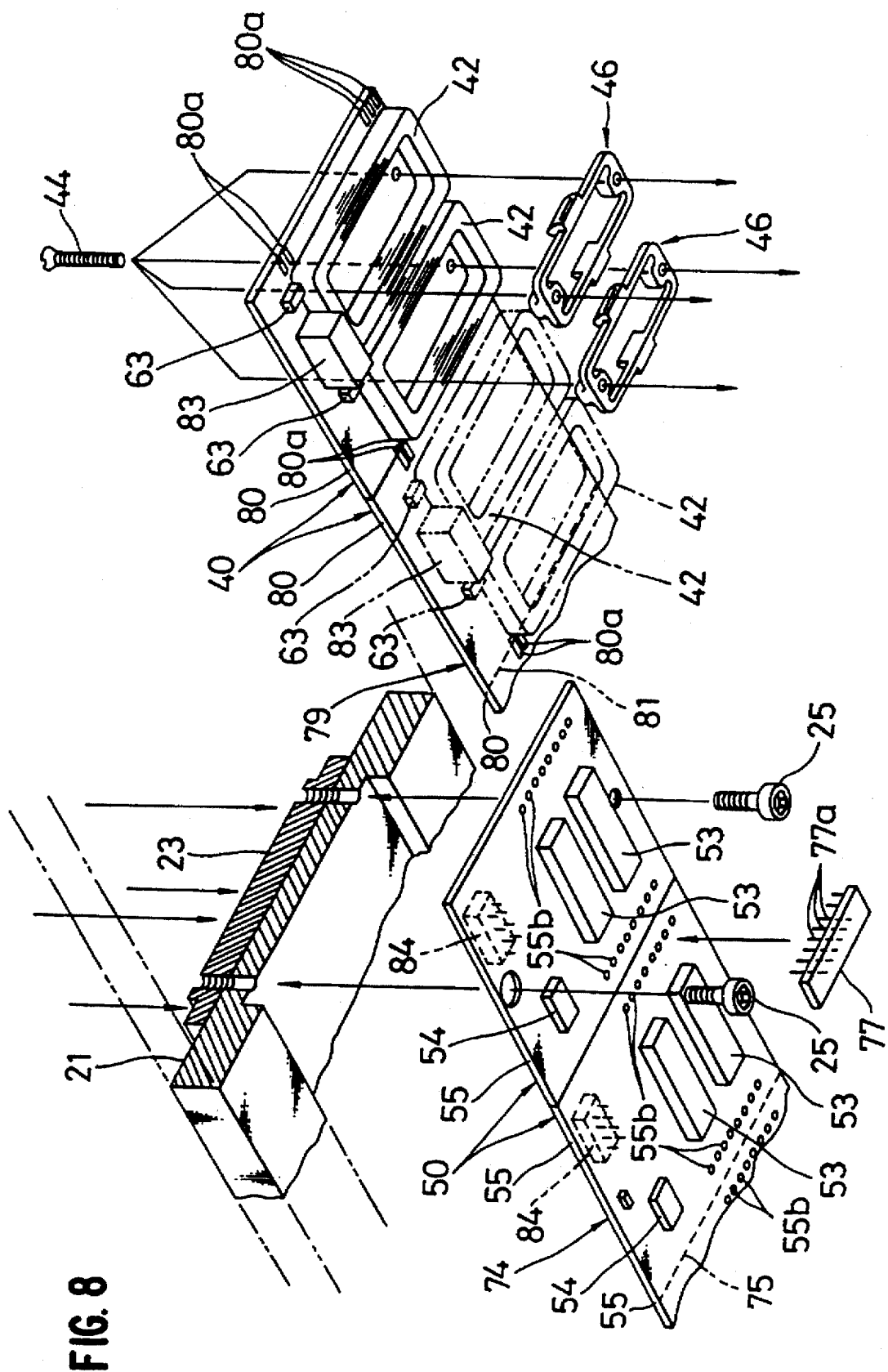
FIG. 8 is an exploded perspective view, including a partial cross-section, of the essential portion of the linear direct current motor contained in the drive unit shown in FIGS. 4 through 6.

To begin with, as shown in FIGS. 4 through 6 and 8, the primary side has the previously described coil yoke 23 installed on bed 21, coil substrate 40 arranged along the lengthwise direction of coil yoke 23 on the upper surface of said coil yoke 23, and, for example, 14 armature coils 42 supported by being affixed in a row along the direction in which the above-mentioned table 22 is to move on the lower surface of said coil substrate 40, namely the side of coil yoke 23. Furthermore, each armature coil 42 is wound into roughly the shape of a rectangular loop. In addition, as shown in FIGS. 5, 6 and 8, Hall effect elements 63 are provided corresponding to each armature coil 42 on coil substrate 40.

Each of the above-mentioned armature coils 42 and coil substrate 40 are fastened together to coil yoke 23 with said coil substrate 40 on the outside by fastening members in the form of countersunk head screws 44, two each, for example, of which are inserted for each of said armature coils 42.

As shown in FIGS. 6 and 8, spacer assemblies 46 are juxtaposed between coil substrate 40, fastened by countersunk head screws 44, and coil yoke 23 into which said countersunk head screws 44 are screwed. These spacer assemblies 46 are provided so that deformation, such as warping and so forth, does not occur in coil substrate 40 caused by tightening of countersunk head screws 44, and are fit inside each armature coil 42.

Next, the following provides an explanation of the circuit substrate for performing supply of electricity and so forth to each of the above-mentioned armature coils 42.

As shown in FIGS. 4, 6 and 8, this circuit substrate 50 is arranged in parallel with coil substrate 40 on the lower surface of bed 21 on which said coil substrate 40 is installed on its upper surface with coil yoke 23 in between. Moreover, said circuit substrate 50 is fastened to said bed 21 by a plurality of bolts 25 (with hexagon sockets). Furthermore, these bolts 25 also serve to fasten the above-mentioned coil yoke 23 to bed 21.

As shown in FIG. 8, the above-mentioned circuit substrate 50 is composed by joining together a plurality of separate portions 55, each provided with a drive circuit composed of electronic components 53, 54 and so forth. These separate portions 55 are provided corresponding to each unit of two armature coils each of the fourteen armature coils 42 provided in a row. Thus, the number of these separate portions 55, in this case, is seven.

The drive circuit provided on each of the above-mentioned separate portions 55 contains one set of circuit portions supplying excitation current to one armature coil 42, or in other words, a circuit corresponding to two armature coils 42.

Continuing, the following provides a detailed description of the separated constitution of the above-mentioned circuit substrate 50 and coil substrate 40 arranged above it.

To begin with, the following provides an explanation of circuit substrate 50.

In the case of fabricating this circuit substrate 50, a base substrate 74, having a base length (a portion is shown in FIG. 8), is made available. This base substrate 74 is composed of, for example, six separate portions 55, explained based on FIG. 8, joined into a single unit. As was previously described, these separate portions 55 are provided with a drive circuit that performs supply of electrical power and so forth to two armature coils 42 each grouped in the form of individual units. Furthermore, as shown in FIG. 8, marks in the form of broken lines 75 are printed on both the top and bottom surfaces of base substrate 74 (only those on the bottom surface are shown in the drawing) for distinguishing each separate portion 55.

Since the previously described circuit substrate 50 must link together seven of the above-mentioned separate portions 55, said circuit substrate 50 is completed by severing one of the six separate portions 55 possessed by the above-mentioned base substrate 74 along the above-mentioned broken line 75 to separate, arranging this separated separate portion 55 in a row at one end of unseparated base substrate 74 as shown in FIG. 8, and mutually connecting their corresponding connection terminals.

Furthermore, in FIG. 8, connection between the above-mentioned separated separate portions 55 and base substrate 74 is performed, for example, by a single connection component 77 having terminals 77a fit into through holes 55b provided in both connection terminal portions. Furthermore, although connection between corresponding connection terminal portions may be performed using copper wire and so forth, by performing connection using this type of connection component 77, in addition to connection being able to be performed all at once, connections are reinforced due to the rigidity of said connection component 77. In addition, besides using components that simply act to make electrical connections, electronic components such as IC and so forth may also be used for connection component 77.

The following provides an explanation of coil substrate 40.

Although the entire coil substrate 40 is not shown, in the case of fabricating this coil substrate 40, a base substrate 79 of a length nearly equal to base substrate 74 for the above-mentioned circuit substrate 50 is made available as shown in FIG. 8. This base substrate 79 is composed by linking together six separate portions 80 into a single unit in the same manner as base substrate 74 for circuit substrate 50. As shown in the drawing, two armature coils 42 each are affixed, grouped together in units, on these six separate portions 80, thus making the total number of armature coils 42 arranged in a row on base substrate 79 twelve. Furthermore, as shown in FIGS. 8 and 5, marks in the form of broken lines 81 are printed on the top and bottom surfaces of base substrate 79 to distinguish these separate portions 80. As shown in FIG. 8, coil substrate 40 is formed by joining and connecting a single separate portion 80, separated from another base substrate not shown, to one end of this unseparated base substrate 79. Furthermore, in FIG. 8, reference numeral 80a indicates connection terminals provided on each separate portion 80.

Furthermore, in the description thus far, although two armature coils 42 each and a drive circuit for driving said armature coils 42 are separated into units with respect to coil substrate 40 and circuit substrate 50, three or more armature coils and their drive circuit may also be separated into their respective units. In addition, although base substrate 74, which supports twelve armature coils 42, and base substrate 79, on which a plurality of drive circuits are arranged in a row corresponding to two of these armature coils 42 each, are made available during fabrication of the drive unit equipped with a total of fourteen armature coils 42 in the present embodiment, it is only natural that the setting of the total length of these base substrates 74 and 79, namely the numbers of armature coils and drive circuits to be equipped on these, can be suitably changed.

In addition, although coil substrate 40 and circuit substrate 50 are composed by separating at least one of separate portions 55 and 80 provided on base substrates 74 and 79, and joining it to unseparated base substrates 74 and 79 in the present embodiment, in the case the operating stroke of the drive unit to be fabricated is shorter than the total length of base substrates 74 and 79, at least one of each of separate portions 55 and 80 provided on each of said base substrates 74 and 79 should be cut away as necessary. Thus, a substrate of desired length can be easily obtained by cutting off one separate portion from the base substrate and joining to another unseparated base substrate, or simply removing a portion of the base substrate. In addition, the remaining portion of the base substrate from which a portion has been cut away as mentioned above can also be used in other applications in any state.

As shown in FIGS. 6 and 8, coil substrate 40 and circuit substrate 50, which are arranged to be mutually separated by bed 21 and coil yoke 23, are connected by connecting a plurality, in this case seven, of connection devices in the form of both corresponding male and female connectors 83 and 84 provided on mutually opposing sides of both said substrates. One each of these connectors 83 and 84 is arranged with respect to each separate portion 55 and 80 each provided with two armature coils 42 and their drive circuit grouped into a unit as previously described. As shown in FIG. 6, said connectors 83 and 84 are mutually connected through apertures 21e and 23e formed in bed 21 and coil yoke 23. Thus, since one each of connectors 83 and 84 is provided for each of separate portions 58 and 80 of coil substrate 40 and circuit substrate 50, when mutually assembling both said separate portions 55 and 80, the directions of both can be recognized both quickly and easily, thus facilitating assembly work. Furthermore, connection of corresponding separate portions 55 and 80 may be performed by lead wires and not by connectors as described above. In addition, with respect to the number of connectors, besides providing only one connector for each of separate portions 55 and 80 as mentioned above, two or more connectors may also be provided.

On the other hand, the secondary side of the linear direct current motor is composed in the manner described below.

Figure 9:
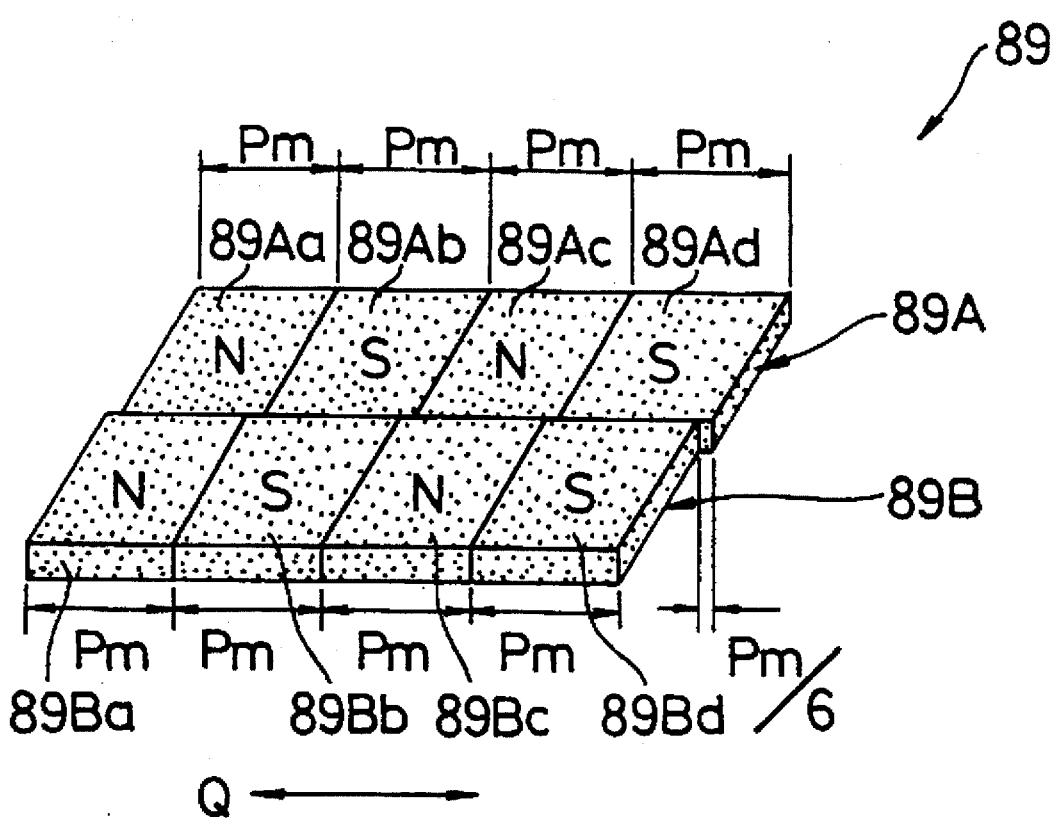
FIG. 9 is a perspective view of a field magnet that is one of the constituent members of the secondary side of the linear direct current motor contained in the drive unit shown in FIGS. 4 through 6.

As shown in FIGS. 4 and 6, said secondary side has magnet yoke 88, mounted on the lower side of table 22, and field magnet 89 anchored on the lower surface of said magnet yoke 88 to oppose each of the above-mentioned armature coils 42 of the primary side. As shown in FIG. 9, field magnet 89 has the form in which two roughly rectangular, horizontally long plate members are coupled at a location slightly shifted in the lengthwise direction. Said field magnet 89 is arranged and magnetized for each of the horizontally long plate members so that a plurality, for example four, N and S magnetic poles are alternately arranged in direction Q in which the primary side and secondary side perform relative movement, namely the lengthwise direction of bed 21. The two horizontally long plate members respectively compose independent field magnet rows 89A (89Aa through 89Ad) and 89B (89Ba through 89Bd), and are arranged so that the phase of the magnetic poles is shifted by ⅙ (including roughly ⅙) between field magnet rows 89A and 89B, namely by the amount the location of the field magnet shifts by Pm/6.

In said drive unit, a position detection device having the constitution described below is provided for detection of the relative positions of the above-mentioned bed 21 and table 22.

Namely, said position detection device is composed of linear magnetic scale 91 shown in FIGS. 4 through 6, and magnetic sensor portion 92 shown in FIG. 6. Said linear magnetic scale 91 extends in the direction of movement of the above-mentioned table 22, and together with a large number of N and S magnetic poles being alternately magnetized at a precise pitch along its lengthwise direction, an origin signal magnetized portion is formed on one end. On magnetic sensor portion 92, together with providing a Hall effect element for origin detection, another two Hall effect elements for the A and B phases are arranged mutually shifted by ½ the above-mentioned pitch. As a result of employing said constitution, both A phase and B phase signals are obtained, thereby enabling detection of relative position and discrimination of direction of movement.

Furthermore, as shown in FIGS. 4 and 6, cables in the form of flexible substrates 94 for obtaining signals from the above-mentioned magnetic sensor portion 92, and cover 95, which covers said flexible substrates 94, are provided.

In the drive unit having the above-mentioned constitution, by supplying a prescribed excitation current to each armature coil 42, thrust is generated based on Fleming's left hand rule between the primary and secondary sides. For example, if bed 21, to which the primary side is coupled, is taken to be the stationary side, table 22, integrated into a single unit with the secondary side, is moved by this thrust. Moreover, the position of table 22 with respect to bed 21 is detected by the position detection device described above.

The following provides an explanation of the constitution for controlling the supply of electrical power to each armature coil 42 described above.

Figure 10:
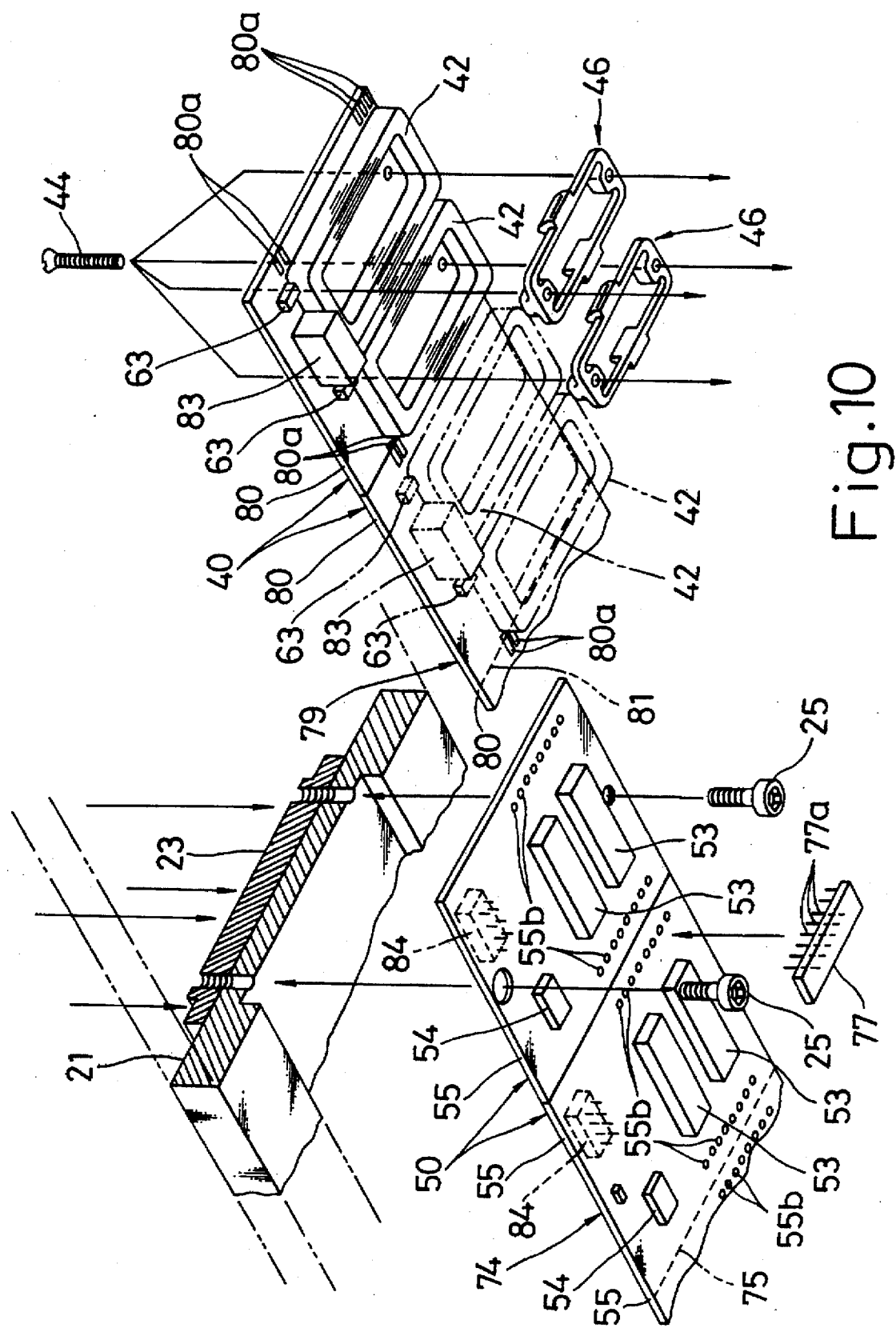
FIG. 10 is a conceptual drawing of the constitution of the linear direct current motor contained in the drive unit shown in FIGS. 4 through 6.

As shown in FIG. 10, in the present embodiment, the open angle width between conductors $42a_1$ through $42f_1$ and $42a_2$ through $42f_2$ that contribute to thrust, and are possessed by each armature coil $42a$ through $42f$ (in this case, six armature coils are shown in FIG. 10, and these six armature coils are mutually distinguished by adding small letters of the alphabet from a through f to reference numeral 42 indicating armature coils in the explanation thus far for the sake of convenience in the explanation) on two sides each, is set to be equal to width Pm of each of magnetic poles 89Aa through 89Ad and 89Ba through 89Bd of field magnet rows 89A and 89B. However, this open angle width of the armature coils is set to be roughly 2n–1 times (where n is an integer of at least 1) the magnetic pole width of field magnet 89. Normally, n is set to a value of 1, and is set to that value in the present embodiment as well. In addition, the interval between adjacent armature coils is set to ⅓ of width Pm of the magnetic poles. Thus, as shown in FIG. 10, the open angle width of the armature coils in the present invention is 180°, and the interval between armature coils is set at 60°.

As shown in FIG. 10, based on the above-mentioned constitution, magnetic pole discrimination elements in the form of Hall effect elements 63a through 63f are arranged in the vicinity of each armature coil 42a through 42f (six Hall effect elements are shown in FIG. 10 in this case, and the small letters of a through f are added to reference numeral 63 used to indicate Hall effect elements in the above-mentioned explanation to mutually distinguish these six Hall effect elements for the sake of convenience in the explanation). These Hall effect elements $63a$ through $63f$ are correspondingly arranged so as to be of the same phase as the magnetic poles of field magnet row 89A. In the present embodiment, each of Hall effect elements $63a$ through $63f$ is arranged corresponding to conductors $42a_2$ through $42f_2$ on one side among the conductors that contribute to thrust possessed on two sides by each armature coil $42a$ through $42f$.

These Hall effect elements $63a$ through $63f$ emit a signal (in the form of a potential difference) corresponding to the lines of magnetic force emitted by the magnetic poles possessed by field magnet row 89A when said field magnet row 89A approaches. Furthermore, there is no effect on field magnet row 89B. This signal is then fed to the above-mentioned drive circuit, and said drive circuit supplies electrical power to the armature coil corresponding to the Hall effect element that emitted said signal based on that signal. This supply of electrical power is interrupted to the armature coil corresponding to a Hall effect element for which said signal has yet to be obtained or is no longer being obtained, thus enabling control to be performed. Thus, by systematically supplying a prescribed excitation current to each armature coil, thrust is generated based on Fleming's left hand rule between the primary and secondary sides. For example, if bed 21, to which the primary side is coupled, is taken to be the stationary side, table 22, integrated into a single unit with the secondary side, is moved by this thrust.

Supply of electrical power is controlled in the manner described below based on the above-mentioned constitution.

FIGS. 11(a) through 11(i) show the relative positions of armature coils 42, Hall effect elements 63 and field magnet 89 that change with movement of field magnet 89. In the present embodiment, since magnetic pole width=armature coil width=Pm, and the distance between armature coils is set to Pm/3, these changes can be considered to occur for every distance of Pm/6. Thus, all changes in relative position can be viewed by the above-mentioned (a) through (i) shifted by Pm/6 each. In the present embodiment, a constitution is employed wherein the open angle width of the armature coils is taken to be Pm, the distance between armature coils is taken to be Pm/3, and this is then divided into 8 divisions. Thus, movement is made in 30° increments in the present embodiment as shown in FIG. 10.

Figure 11A:
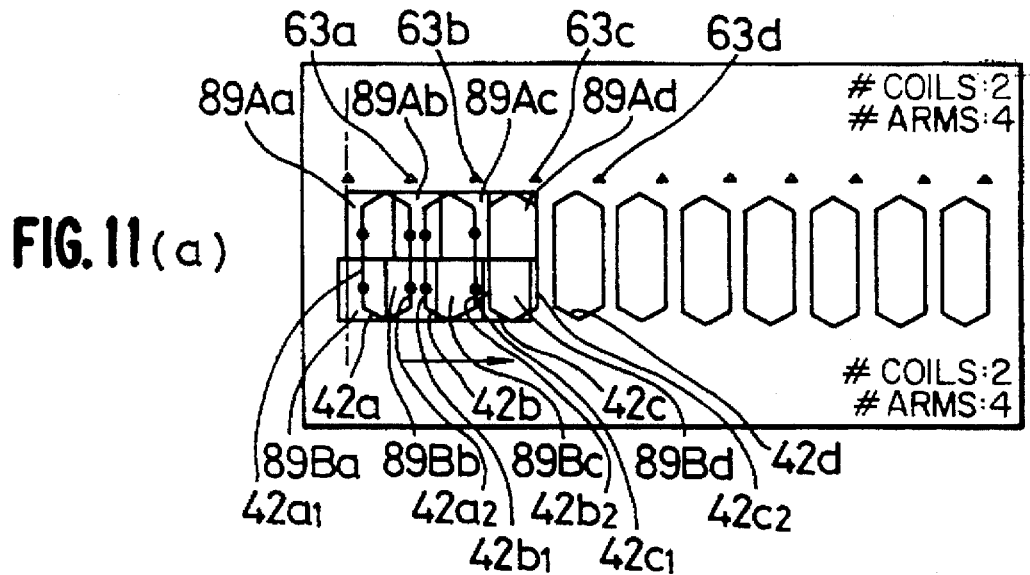
FIGS. 11(a) through 11(f) are explanatory drawings of the operation of the linear direct current motor contained in the drive unit shown in FIGS. 4 through 6.

To begin with, in the case field magnet 89 is at position shown in FIG. 11(a), namely in the case armature coil $42c$ and magnetic pole 89Ad are superposed, since only magnetic poles 89Ab and 89Ac of said field magnet row 89A act on two Hall effect elements $63a$ and $63b$, electrical power is supplied to two armature coils $42a$ and $42b$ respectively corresponding to these Hall effect elements. In this state, as is clear from the same drawing, since each conductor $42a_1$, $42a_2$, $42b_1$ and $42b_2$, of which two sides each are possessed by both said armature coils $42a$ and $42b$, generates thrust by magnetic poles 89Aa, 89Ab and 89Ac of field magnet row 89A, the number of conductors that contribute to thrust is four. These are indicated with a circle in said drawing. Furthermore, since conductors $42c_1$ and $42c_2$ of armature coil $42c$ act on the boundary between adjacent magnetic poles of field magnet row 89A, thrust is not generated. Furthermore, since Hall effect element $63c$ acts on the boundary of the field magnet ($42c_2$), the above-mentioned signal is not emitted, thus resulting in electrical power not being supplied to the corresponding armature coil $42c$.

In addition, in the case field magnet 89 is at the position shown in FIG. 11(a), the magnetic pole arrangement of field magnet row 89B is delayed by ⅛ phase (electrical angle of 30°) with respect to the above-mentioned field magnet row 89A. In looking at the same drawing with respect to this field magnet row 89B, since each conductor $42a_1$, $42a_2$, $42b_1$ and $42b_2$, which is possessed by corresponding armature coils $42a$ and $42b$ that have already been supplied with electrical power by the above-mentioned field magnet row 89A, generates thrust by magnetic poles 89Ba, 89Bb and 89Bc of field magnet row 89B, the number of conductors that contribute to thrust is four. These are indicated with a circle in said drawing.

Figure 11B:
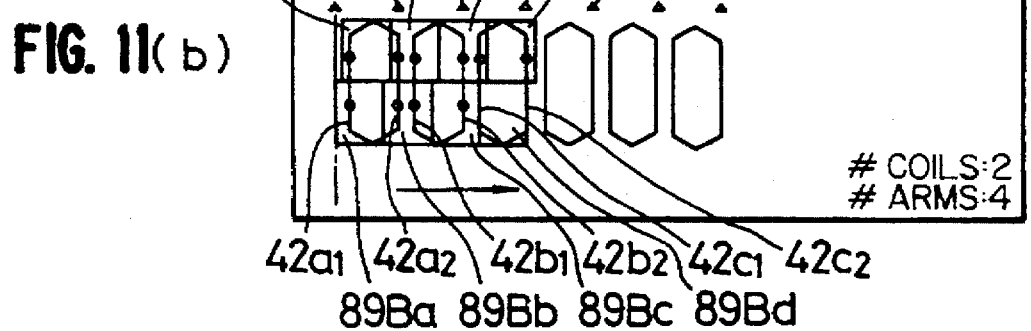
Figure 11C:
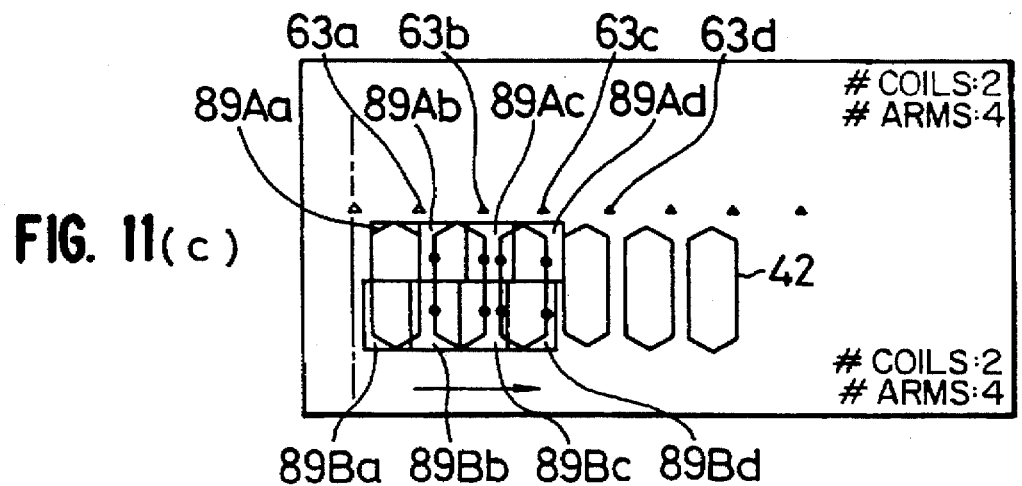
Figure 11D:
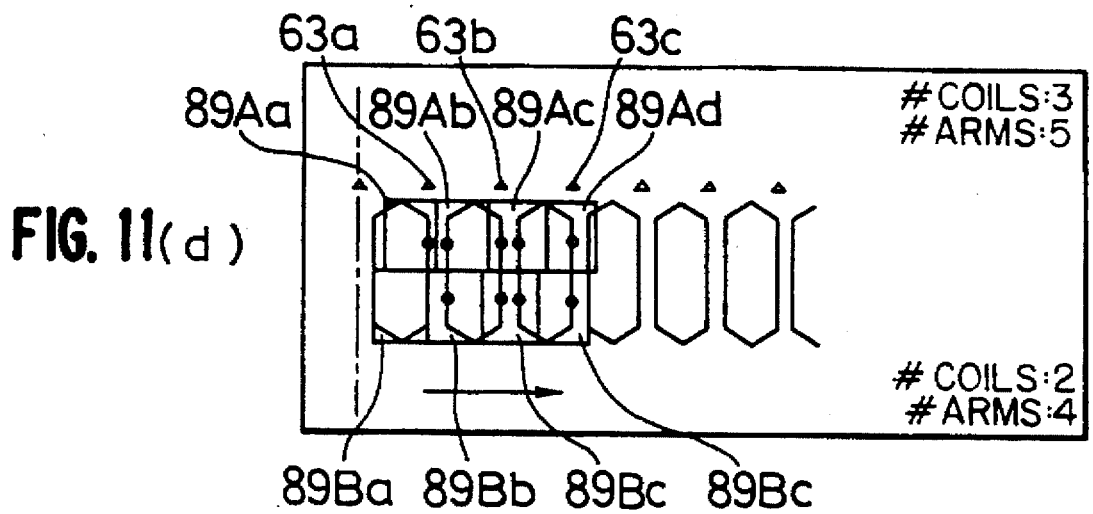
Figure 11E:
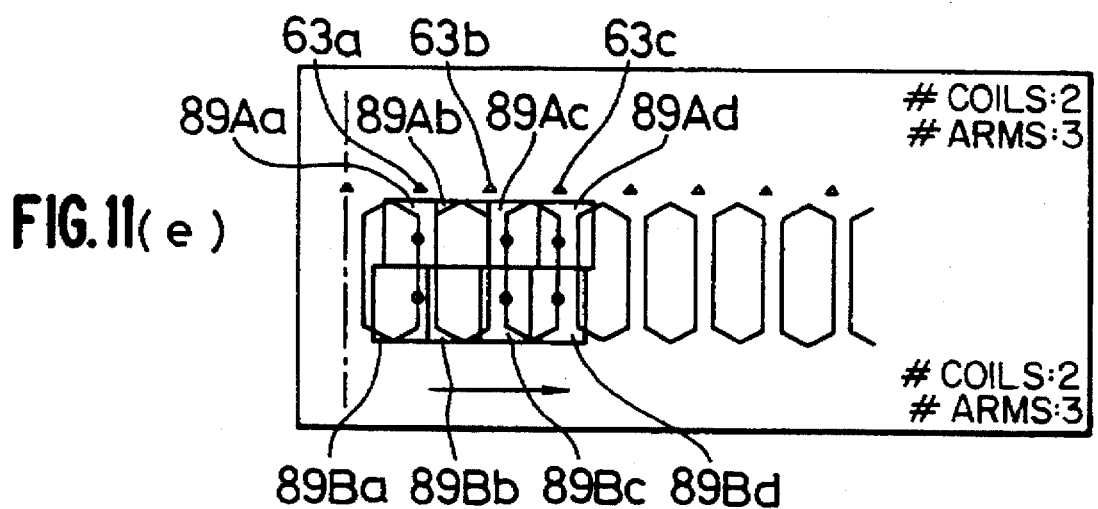
Figure 11F:
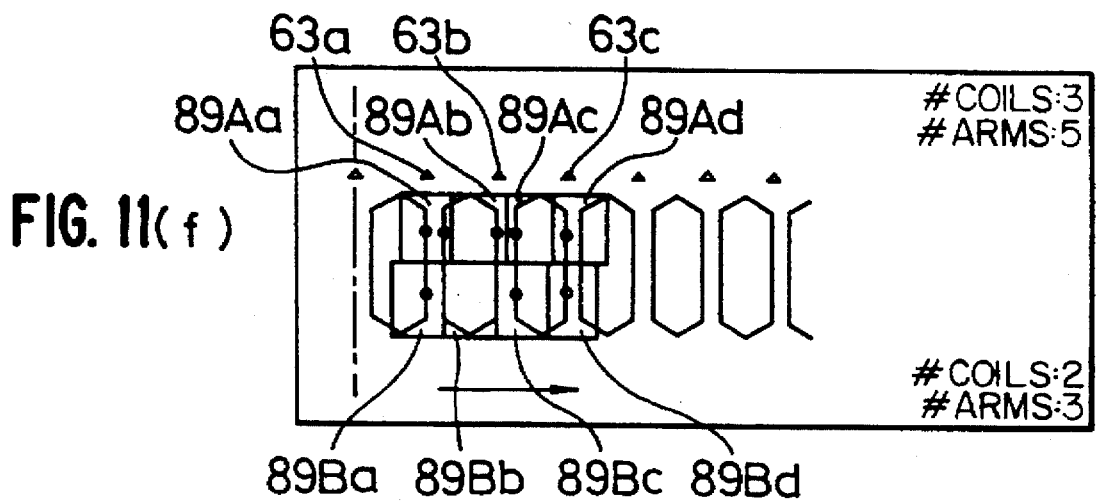
Figure 11G:
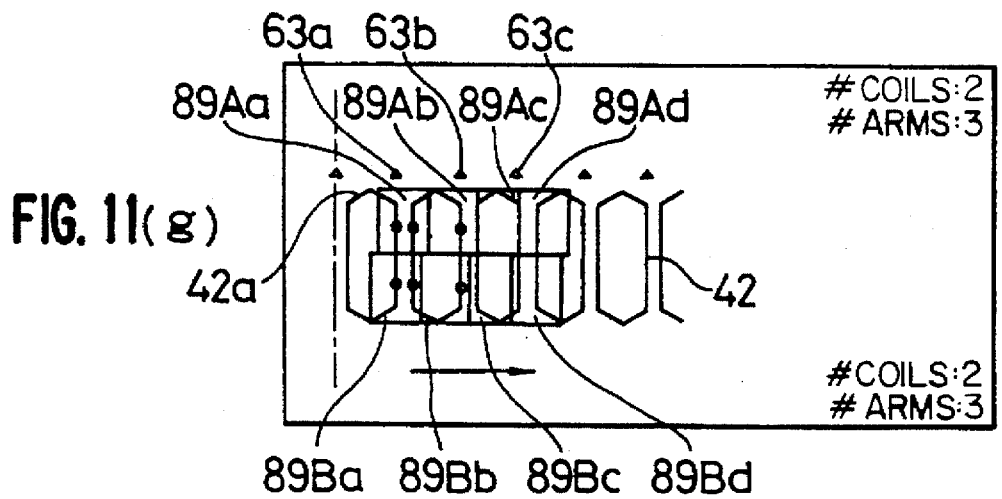
Figure 11H:
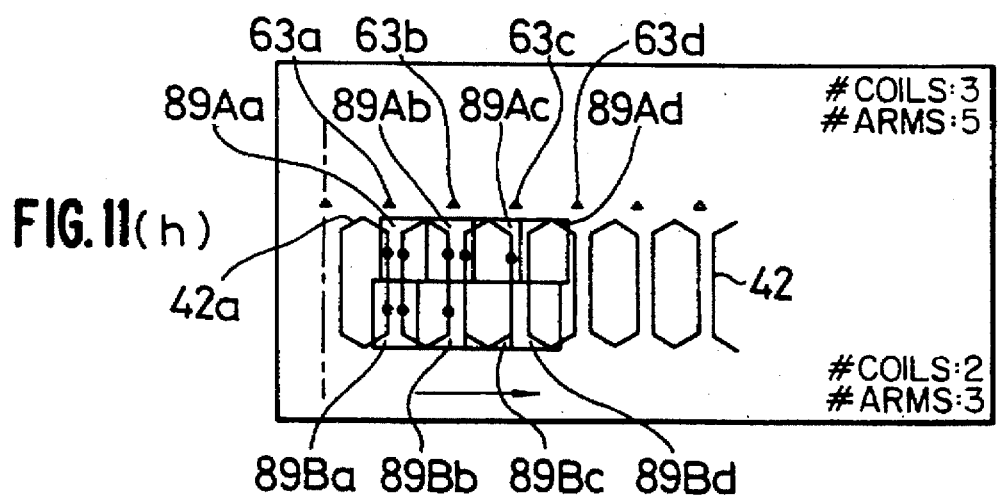
Figure 11I:
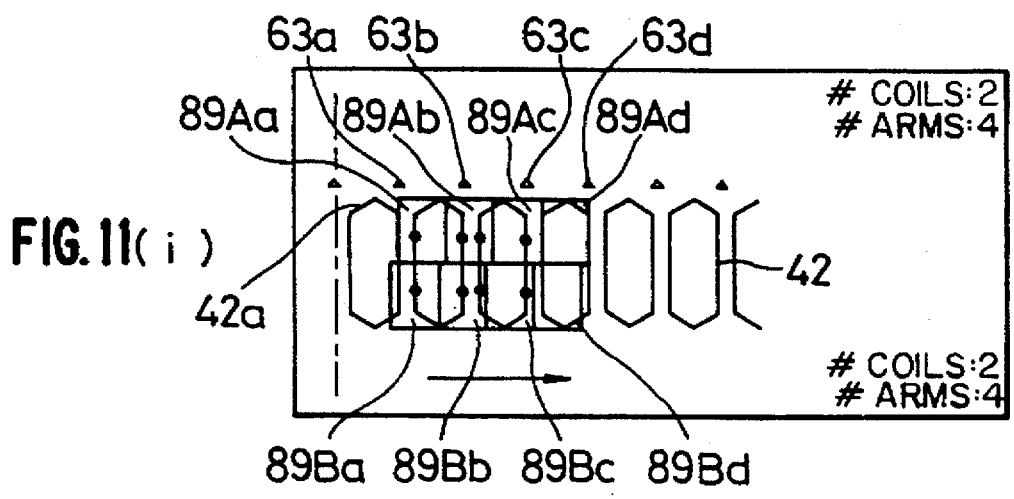

Next, in the case field magnet 89 is at the position shown in FIG. 11(b), namely in the case field magnet 89 has been moved in the direction of the arrow by Pm/6, as shown in this same drawing, each of magnetic poles 89Ab, 89Ac and 89Ad of field magnet row 89A act on three Hall effect elements $63a$ through $63c$. Accordingly, electrical power is supplied to the three armature coils $42a$ through $42c$ corresponding to these three Hall effect elements. As is clear from said drawing, in this state, since conductors $42a_1$, $42a_2$, $42b_1$, $42b_2$, $42c_1$ and $42c_2$, which are possessed by each of said armature coils $42a$ through $42c$, generate thrust by magnetic poles 89Aa, 89Ab, 89Ac and 89Ad of field magnet row 89A, the number of conductors generating thrust is six.

In addition, in the case field magnet 89 is at the position in the above-mentioned FIG. 11(b), since field magnet row 89B is at the same position as field magnet row 89A in the case of being in the position in FIG. 11(a), those conductors that contribute to thrust consist of $42a_1$, $42a_2$, $42b_1$ and $42b_2$, the number of conductors contributing to thrust is four. Furthermore, although electrical power is supplied to armature coil $42c$, since its conductors $42c_1$ and $42c_2$ are acting on the boundary of adjacent magnetic poles of field magnet row 89B, thrust is not generated.

Although the following operations are omitted since the explanation is similar, when field magnet 89 is at each of the remaining positions shown in FIG. 11(c) through 11(i), the numbers of conductors contributing to thrust possessed by each armature coil that actually generate thrust are 4, 5, 3, 5, 3, 5 and 4 conductors for field magnet row 89A, and are the same as the case of the example of the prior art previously explained in FIGS. 3 through 5. On the other hand, since field magnet row 89B is shifted by ⅛ phase, the numbers of conductors are 4, 4, 3, 3, 3, 3 and 4 conductors.

The relationship between the number of conductors of the armature coils that contribute to thrust and the thrust that is actually generated is shown in FIG. 12 wherein the relative position changes between the above-mentioned field magnet row and armature coils are shown for 1 cycle. In contrast to the amount of change in thrust being large and thrust ripple also being large in the four pole, three coil drive unit of the prior art shown in FIG. 12(a), in the 4 pole, 3 coil drive unit using separate field magnets of the embodiment of the present invention shown in FIG. 12(b), the thrust obtained by combining the thrust of each of two field magnet rows has less amount of change and less ripple. In addition, although field magnet 89 is explained in terms of being a 4 pole field magnet in the present embodiment, a 5 pole field magnet can naturally also be applied. Moreover, it is also possible to compose the present invention by using a 5 pole field magnet for field magnet row 89A (Hall effect element side) and a 4 pole field magnet for field magnet row 89B.

Furthermore, in FIG. 10, if the position at which each Hall effect element is currently arranged, namely the position of conductors $42a_2$ through $42f_2$ on the right side of each armature coil $42a$ through $42f$, is expressed as an electrical angle of 0° (in the drawing, however, the position of Hall effect element $63e$, namely the position of conductor $42e_2$ of armature coil $42e$, is indicated as 0° as a representative example), the electrical angle positions of the conductors of each armature coil are as shown in the drawing in the case of a linear direct current motor like that in the present embodiment having 4 poles and 3 coils.

In addition, although a guide unit having a mechanical constitution is shown for the guiding device that performs mutual guiding of the primary side and secondary side in the above-mentioned embodiment, a guiding device can be employed having a constitution that relatively levitates both primary and secondary sides by the pressure of a fluid (air or oil) or magnetic force.

In addition, although a moving magnet type of linear direct current motor is shown in the above-mentioned embodiment wherein the side containing armature coils 42 is taken to be the stationary side and the side containing field magnet 89 is taken to be the moving side, the present invention can also be applied to a moving coil type of linear direct current motor.

Moreover, the present invention can be applied similarly in the form of another embodiment in the case of bed 21 and so forth having a certain curvature, and the present invention performing curved motion.

According to the present invention as has been explained above, the present invention is able to perform smooth operation as a result of reducing thrust ripple accompanying changes in the relative positions of the primary and secondary sides.

What is claimed is:

1. A linear direct current motor comprising:

a field magnet in which P number of poles (P being an integer of at least 2) are arranged and magnetized so that they are sequentially different;

a group of armature coils wound so that an open angle width of conductors contributing to thrust is roughly 2n−1 times (where n is an integer of at least 1) a magnetic pole width of said field magnet, said armature coils being arranged so as to oppose said field magnet for driving said field magnet relative to said armature coils when said armature coils are supplied with an excitation current; and magnetic pole discrimination elements, a respective one of said discrimination elements being provided for each one of said armature coils, said discrimination elements discriminating the magnetic poles of said field magnets, wherein said field magnet comprises at least two rows of field magnets, wherein a phase of a magnetic pole arrangement differs from one row to another row.

2. A linear direct current motor as set forth in claim 1, wherein said rows of field magnets each extend in a direction of relative movement of said field magnet and said armature coils.

3. A linear direct current motor as set forth in claim 1, wherein there are two rows of field magnets, and the magnetic poles in each row are arranged so that a phase of the magnetic poles is shifted by ⅛ between said two rows.

* * * * *